United States Patent [19]
Krieg et al.

[11] Patent Number: 5,278,363
[45] Date of Patent: Jan. 11, 1994

[54] CONTROL DEVICE FOR THE CONTROL OF STEPPING MOTORS FOR THE ADJUSTMENT OF A MOTOR VEHICLE SEAT

[75] Inventors: Karl-Heinz Krieg, Ebersbach; Siegfried Klink, Schönaich; Josef Berger, Wolfschlugen; Heinz Baumert, Sindelfingen; Jürgen Bollman, Bad Liebenzell; Siegfried Nothacker, Weil der Stadt; Edgar Pieper, Böblingen, all of Fed. Rep. of Germany

[73] Assignee: Mercedes-Benz AG, Fed. Rep. of Germany

[21] Appl. No.: 593,909

[22] Filed: Oct. 5, 1990

[30] Foreign Application Priority Data
Oct. 7, 1989 [DE] Fed. Rep. of Germany ....... 3933561

[51] Int. Cl.$^5$ ............................................. H01H 9/26
[52] U.S. Cl. ........................ 200/5 R, 5 A, 5 b, 6 B, 17 R, 17 A, 18, 52 R; 200/5 B
[58] Field of Search ........................... 200/5; 397/330; 318/282, 286

[56] References Cited
U.S. PATENT DOCUMENTS
4,853,687 8/1989 Isomura et al. ................. 340/825.3

Primary Examiner—A. D. Pellinen
Assistant Examiner—Michael A. Friedhofer
Attorney, Agent, or Firm—Evenson, McKeown, Edwards & Lenahan

[57] ABSTRACT

A control device for the control of stepping motors for the adjustment of a motor vehicle seat, including an adjustment of the seat depth, being the distance between the front edge of the seat surface and the backrest, for adaptation to different thigh lengths of the respective passengers. The control device comprises, in a preferred embodiment, at least one actuating element with two parts, that are displaceable independently of but parallel to each other, as well as first and second switches assigned to parts of the actuating element, respectively, wherein the first switches are provided to control at least the seat depth adjustment, while the second switches are provided to control at least the longitudinal seat adjustment.

30 Claims, 2 Drawing Sheets

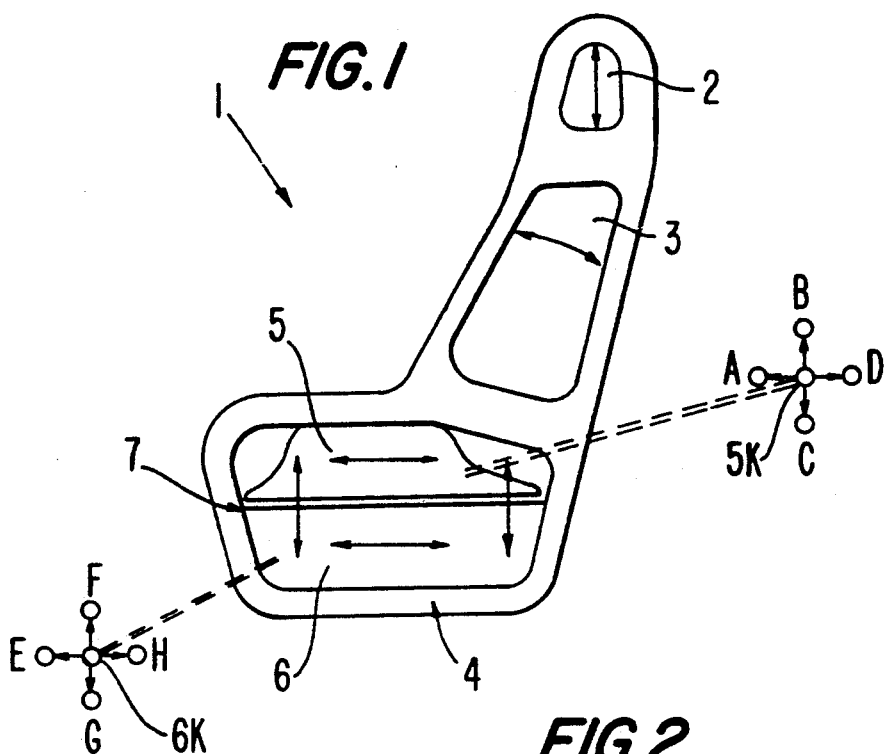
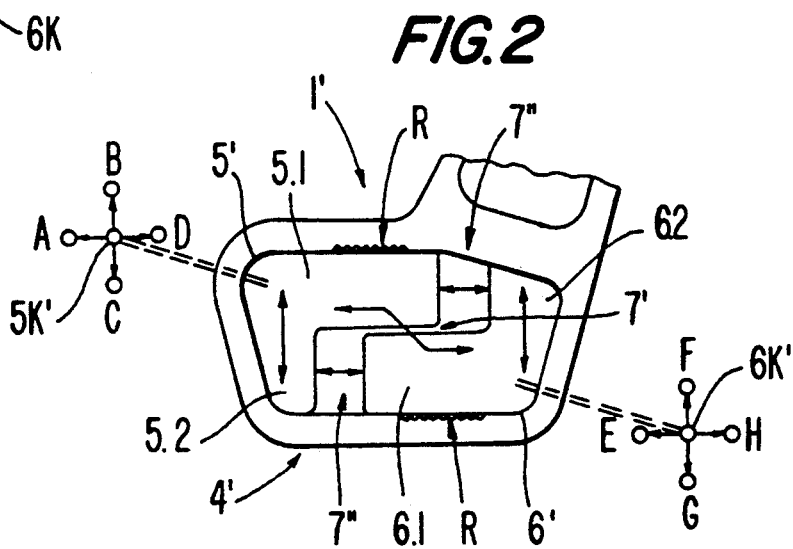
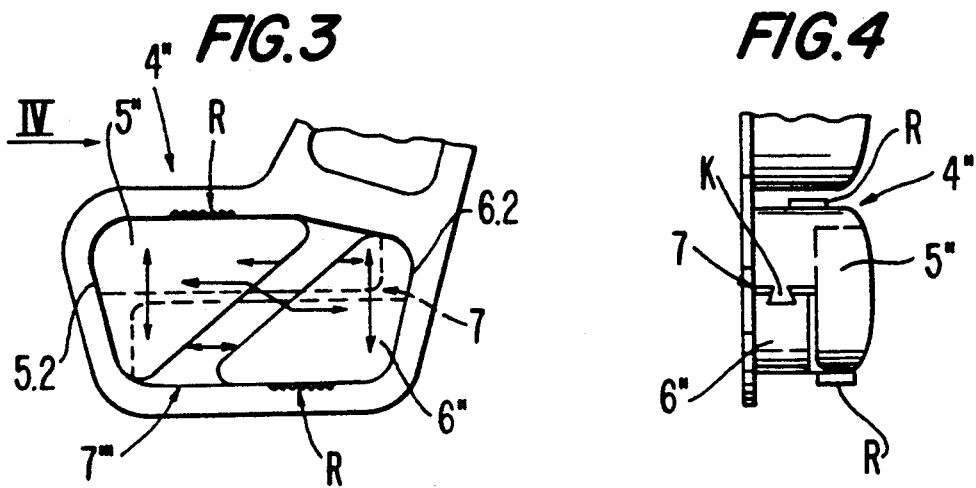

CONTROL DEVICE FOR THE CONTROL OF STEPPING MOTORS FOR THE ADJUSTMENT OF A MOTOR VEHICLE SEAT

BACKGROUND AND SUMMARY OF THE INVENTION

The present invention relates to a control device for the control of stepping motors for the adjustment of a motor vehicle seat.

A control device of this generic type is disclosed in German patent document DE 2,836,004 C2. In addition to a tiltable switch actuating element for the backrest adjustment, it contains a switch actuating element for seat height adjustment and longitudinal adjustment of the seat, which can be: (i) displaced in the horizontal direction in order to move the complete vehicle seat forwards or backwards, (ii) displaced in the vertical direction in order to change the seat height, and (iii) swivelled about a horizontal axis in order to change the relative height position between the front edge and the rear edge of the seat cushion. The switch actuating elements are arranged in such a way that, in the plan view, they represent symbols of the outlines of a seat with backrest and seat cushion.

A possible arrangement of the electric switching means in a control device of the generic type is described in German patent document DE 2,839,367 C2. Another known control device disclosed in German patent document DE 3,513,050 A1 has symbols for backrest and seat cushion which are not movable; however, separate switch actuating elements are provided which are moveable in obvious directions relative to the symbols in order to actuate electric switching means. By "obvious directions" it is meant that the movement of the switch relative to the orientation of the symbolic representation of the seat corresponds to the direction of desired movement of the seat itself.

An arrangement of switch actuating elements of a seat adjustment switch is also disclosed in German patent document EF 0,260,213, A2, in which the outlines of backrest and seat cushion are likewise reflected symbolically by the switch actuating elements, the seat cushion being represented by a total of four switch actuating elements arranged quadrantally. To actuate the electric switching elements, the switch actuating elements must be pressed, it being possible for different setting functions to be controlled by simultaneous operation of two actuating elements and by operation of individual actuating elements.

A fourth known control device for seat adjustment, described in German patent document DE 8,516,069 U1 likewise has a frame-like switch actuating element symbolizing a seat cushion, which switch actuating element is displaceable in an obvious direction for the longitudinal adjustment of the seat as a whole. Two further depressible switch actuating elements are integrated into said switch actuating element, of which one serves for raising and the other for lowering the seat. The latter arrangement—which is no longer operable in an obvious sense—forms in function a single change-over contact with a central position and two different actuating elements.

With the control devices described in the latter three publications, only those seat adjustment functions described with respect to the control device of the aforementioned generic type can be controlled.

In German patent document DE 3,631,872 C1 a vehicle seat is described in which the "seat depth" (that is to say the distance between the front edge of the seat and the backrest) can be changed electromotively or by hand to adapt to different thigh lengths of the respective passengers. In addition to the mechanical alternative of a "handwheel", in this publication, however, no device is disclosed for the manual control of the electromotive seat depth change. In another known vehicle seat, described in German patent document DE 3,018,323 C2, the seat depth can likewise be adjusted electromotively or hydraulically; in the latter publication, however, again no means are disclosed for the manual control of the adjustment drives.

The object of the present invention is to develop a control device of the generic type in which the further function "adjust seat depth" can be implemented whilst retaining its obvious operability.

This object is achieved according to the invention by division of the actuating element for the seat cushion adjustment in such a manner that it is possible not only to push the complete seat forwards or backwards by displacing at least the one part of the actuating element as previously known, but also to change the seat depth by displacing at least the other part of the actuating element, while at the same time retaining the obvious correlation between movement of the actuating element and the desired movement of the seat. The adjustment possibilities already mentioned and already hitherto available are, of course, also maintained by means of the two-part switch actuating element according to the invention.

The purpose of such a switch actuating element, which is preferably subdivided horizontally in the installation position, becomes evident to any operator if the seat depth adjustment is allocated to the top part of the switch actuating element and the longitudinal adjustment of the position of the seat is allocated to its bottom part, because the operator can readily associate the seat cushion surface facing him/her—which he/she can lengthen or shorten—to the top part and can associate the chassis of the entire seat to the bottom part.

It can be advantageous in terms of user-friendliness to design the two parts of the actuating element for the control of the adjustment of the seat depth so as to be displaceable at the same time, but in opposite directions, with appropriate contact assignment in order to be able to select the seat depth change obviously with the switch actuating element. In further preferred shaping of the actuating element parts, this opposite displacement of the parts ca result in a lengthening or a shortening of the overall length of the actuating element from a neutral basic position, which at the moment of operation likewise corresponds exactly to the desired adjustment function. This operation in opposite directions can readily be effected by a "shearing movement" of the thumb and one finger of the operator's hand. It also largely prevents both parts of the actuating element from being inadvertently displaced upwards or downwards during the seat depth adjustment and thus prevents unintentional upward or downward seat adjustment from being triggered.

The customary longitudinal adjustment of the seat in the passenger compartment can again be controlled advantageously in the previously mentioned embodiments by displacing the entire actuating element, that is to say displacement of both actuating element parts simultaneously and in opposite direction, if the electric switching means for the longitudinal adjustment are also assigned to both actuating element parts.

In a further embodiment of the invention, the seat depth adjustment is interpreted starting from another aspect. Since the change in seat depth, as already defined, relates in any case to the distance between the front edge of the seat and the backrest, it can also be considered as a relative displacement of the backrest in relation to the seat cushion or its front edge, irrespective of whether the backrest is fixed and the seat cushion is completely or partially displaced, as corresponds to the customary implementation, or whether the seat cushion is fixed and the backrest is displaced. According to this consideration, a surprisingly simple extension of the control device of the generic type for seat depth adjustment is found in the fact that the actuating element symbolizing the backrest, which could hitherto only be swivelled, is now additionally arranged or guided so as to be displaceable, and the switching means for the seat depth adjustment are assigned to the displacement movement of this actuating element. Preferably, but not necessarily, the displacement movement of this actuating element is naturally guided along the longitudinal extension of the single-part actuating element symbolizing the seat cushion in order to achieve, in this case too, an obvious operation and control of the desired adjustment movement of the seat.

In still another embodiment, a second function level, a double assignment so to speak, is assigned to a single-part actuating element for the longitudinal adjustment of the seat by the fact that the switching mean for the seat depth adjustment are also directly assigned to said actuating element. In this case it is particularly advantageous to provide for both adjustments only one set of electric switching means which can be switched over via a change-over device, which is actuated at the same time, by depressing or pulling out the actuating element from the basic position—in which it preferably controls the longitudinal adjustment of the seat.

Other objects, advantages and novel features of the present invention will become apparent from the following detailed description of the invention when considered in conjunction with the accompanying drawings.

BRIEF DESCRIPTION OF THE DRAWINGS

FIG. 1 shows a first embodiment of a control device according to the invention, in which the switch actuating element for the longitudinal adjustment of the seat and the seat depth adjustment is divided by a partial joint extending horizontally in a straight line, FIG. 2 shows a second embodiment of a control device according to the invention, in which the switch actuating element for the longitudinal adjustment of the seat and the seat depth adjustment is divided into two parts of angular construction, the overall outline of which, in turn, symbolizes a seat cushion, FIG. 3 shows a third embodiment of a divided actuating element for the longitudinal adjustment of the seat and the seat depth adjustment, in which a partial joint section, visible on the surface, forms a wide, obliquely increasing gap, FIG. 4 shows a view of the actuating element which, in relation to FIG. 3, has been rotated out of its plane by 90°.

DETAILED DESCRIPTION OF THE DRAWINGS

Figure 5:
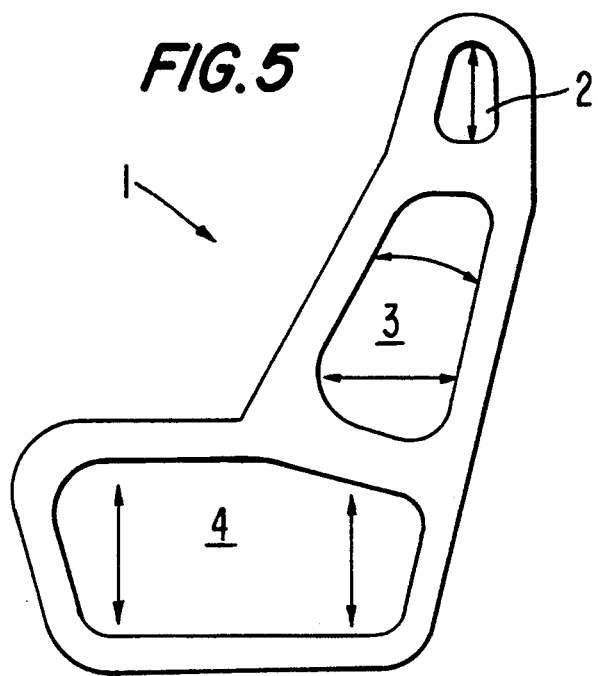
FIG. 5 shows a fourth variation of the control device, in which a swivellable actuating element for the adjustment of the backrest inclination is additionally displaceable relative to the actuating element for the longitudinal adjustment of the seat in order to control the seat depth.

Referring to FIG. 1, there is shown a control device 1 having a switch actuating element 2 symbolizing a headrest, a switch actuating element 3 symbolizing a seat backrest and a switch actuating element 4, which is divided into a top part 5 and a bottom part 6 by a partial joint 7 extending horizontally in a straight line, symbolizing a seat cushion of a motor vehicle seat (not illustrated) which can be adjusted by means of external force. An operator can displace the switch actuating element 4 (that is, parts 5 and 6) and element 2 in the directions respectively designated by double arrows, or can swivel the switch actuating element 3 and thus control adjustment movements of the respectively symbolized seat components. The actuating element parts 5 and 6 are only jointly displaceable in the vertical direction, but are displaceable both jointly and individually in the horizontal direction, as is indicated by the horizontal double arrows drawn in both parts. For this purpose, the actuating elements or parts are each guided in a known manner in suitable connecting links and are returned preferably resiliently to their illustrated starting positions.

In the case of the displacement direction indications mentioned, it is assumed that the control device is installed inside the vehicle in an at least approximately vertical plane (door panelling or lateral seat wing) so that the part 5 is then also located at the top and the part 6 at the bottom.

Electric fixed contacts A, B, C, D or E, F, G, H are indicated diagrammatically which correspond in each case to a switching contact 5K or 6K assigned to the actuating element parts 5 or 6. The respective mechanical connection between the actuating element part and the switching contact is indicated by a dashed double line. Whenever one of the switching contacts 5K or 6K is electrically contacted by one of the fixed contacts A-D or E-H assigned to it by displacement of one of the actuating element parts 5 or 6 in the corresponding direction, due to the electric potential present at the switching contact an electric signal occurs on a control or evaluation circuit connected to the fixed contacts, which signal is used at least indirectly for a corresponding control of a setting element arranged in the motor vehicle seat. A control or evaluation circuit of this type is always present, for example, when a memory circuit is also provided for programmable and recallable seat positions.

For this representative embodiment, the arrangement of the switching contacts 5K and 6K was selected such that the switching contact 5K is assigned to the rear end of the actuating element part 5, and the switching contact 6K to the front end of the actuating element part 6. Each switching contact 5K or 6K can be switched from the illustrated resting position in four directions—indicated by small arrows—to each of which one of the fixed contacts A to D or E to H is assigned. The possible or required seat adjustment functions are thus controllable according to the following Table I:

TABLE I

| Switching contact | | |
|---|---|---|
| 5K | 6K | Seat movement |
| to fixed contact: | | |
| a) — | E | push forward |
| b) B | F | raise |
| c) C | G | lower |
| d) — | H | push backward |
| e) — | F | raise at the front |
| f) — | G | lower at the front |
| g) B | — | raise at the rear |
| h) C | — | lower at the rear |
| i) B | G | raise at the rear, lower at the front |
| j) C | F | raise at the front, lower at the rear |
| k) A | — | lengthen seat cushion |
| l) D | — | shorten seat cushion |

It is clear that the operation cases a) to j) of this table reflect the seat adjustment functions already possible hitherto, while the cases k) and l) reflect the newly added functions for changing the seat depth. The cases i) and j) respectively are simply superpositions of the cases f) and g) or e) and h), and correspond to a swivel movement of the actuating element 4 about a horizontal axis in anticlockwise or clockwise direction (in the plane of the drawing). In this case the starting point is the arrangement of the adjustment drives on the seat shown in German patent document DE 2,836,004 C2 forming the generic type.

Contacts A, D, E and H, in FIG. 1 (the contacts activated in each case on horizontal displacement of the actuating element 4 or its parts 5 and 6) are used alone for the control of an adjustment operation, while the contacts B, C, F and G can be used both alone and in combination with one other contact for control purposes. It may be expedient for the displacement paths of part 5 of the actuating element 4, which are necessary to activate the fixed contacts A and B, to be made longer than the displacement paths of part 6 of the actuating element 4 which are necessary to activate the fixed contacts E and H; this prevents inadvertent false operation which occurs when the two parts 5 and 6 are displaced simultaneously for the longitudinal adjustment of the seat. Of course, this displacement path ratio could also be reversed.

In an actuating element of the type shown in FIG. 1, the fixed contacts located respectively opposite each other (A/D, B/C, E/H, F/G) are parts of change-over feelers, switching contact of which, having a neutral central position, is formed in each case by the switching contact 5K or 6K, two change-over feelers in each case having a common switching contact.

A switch arrangement of this type can be implemented, for example, by a cross-shaped rocker switch at electric potential having four switching arms, which rocker switch forms the respective switching contact 5K or 6K, the individual actuating element displacing operations guided in the connecting link pressing down one of the switching arms in each case and bringing it into contact with the fixed contact respectively assigned to said switching arm.

The variation 1' of the control device according to the invention shown in FIG. 2 differs from the embodiment shown in FIG. 1 only in that the bottom part is divided into two angularly shaped actuating element parts 5' and 6' which, in turn, in the overall outline symbolize a seat cushion. The angular shape of the actuating element parts is formed in each case by a long limb 5.1, 6.1 and a short limb 5.2, 6.2, which limbs are located mutually in parallel opposite each other. The horizontally arranged long limbs 5.1 and 6.1 are separated from one another in the illustrated resting position by a narrow partial joint section 7' which cannot be narrowed further. The vertically extending short limbs 5.2 or 6.2 are each separated from the ends of the long legs 6.1 or 5.1 located opposite them in each case by a wide partial joint section 7''. Double arrows drawn vertically in the short legs 5.2 or 6.2 indicate their displaceability in the direction of the arrows.

The wide partial joint section 7'' allow a mutual approach of the two partial actuating elements 5' and 6' in the horizontal direction—indicated by small arrows pointing towards each other in the top partial joint section 7''. In this manner, a shortening of the overall length of the actuating element 4' can be associated obviously with a shortening of the available seat depth. An operator can grip and squeeze the actuating element 4' from above with the thumb and index finger of one hand at its front edge—on the left in the figure—and rear edge—on the right side of the figure or at the short legs 5.2 and 6.2 of the parts 5' and 6' forming these edges, which results in the simultaneous displacement in opposite directions of both actuating element part 5' and 6'. In the design of the connecting link guides for said actuating element parts, attention must be given to the fact that each part cannot be displaced towards the other by more than half the width of the wide partial joint section 7'' in order to guarantee a necessary simultaneous loading of the fixed contact more—details of which will be given later. The horizontal displacement stroke of the actuating element part 5' and 6', which is then still possible, must naturally be sufficiently large for the reliable actuation of the electric switching means (in particular fixed contacts D and E).

In the opposite direction, by a shearing movement of the thumb and finger of one hand, which act in each case on the top side and underside—this shearing movement advantageously being supported by a surface structure molded onto these sides, e.g. an indicated grooving R—a simultaneous displacement in opposite directions of both actuating element part 5' and 6' is possible—indicated by small arrows pointing away from one another in the bottom partial joint section 7''—which displacement enlarges the overall length of the switch actuating element 4' shown and can therefore by obviously associated with a lengthening of the available seat depth. With this displacement movement in opposite directions, the two actuating element parts are also supported on one another so that a superimposed tilting moment is avoided. The common displaceability of the two parts is indicated by a double arrow extending essentially horizontally and stretching in a curved manner over both actuating element parts 5' and 6'.

Once again each actuating element 5' or 6' has assigned to it a switching contact 5K' or 6K' which, in turn, correspond in each case to fixed contacts A to D or E to H. The possible or required seat adjustment functions of the two variations are thus controllable, for example according to the following Table II:

TABLE II

| | Switching contact | | |
|---|---|---|---|
| | 5K | 6K | Seat movement |
| to fixed contact: | | | |
| a) | A | E | push forwards |
| b) | B | F | raise |
| c) | C | G | lower |
| d) | D | H | push backwards |
| e) | B | — | raise at the front |
| f) | C | — | lower at the front |
| g) | — | F | raise at the rear |
| h) | — | G | lower at the rear |
| i) | B | G | raise at the front, lower at the rear |
| j) | C | F | raise at the rear, lower at the front |
| k) | A | H | lengthen seat cushion |
| l) | D | E | shorten seat cushion |

The signal combination of the above Table II differ from those of Table I in that activation of individual fixed contacts is effective only to adjust the height of the front or rear edge of the seat, while for all other adjustments two fixed contacts are activated simultaneously. This has the advantage, inter alia, that an operator no longer has to pay attention to which of the actuating element parts 5' or 6' he/she must operate both in the case of longitudinal adjustment of the complete seat and in the change of the seat depth. The switching means for the longitudinal adjustment of the entire motor vehicle seat and for the seat depth adjustment of the same seat are thus assigned to both actuating elements parts 5' and 6'.

Logic operations necessary according to the second table are implemented, for example, by AND gates, which generate an output signal to activate the respective seat adjustment drive only when both fixed contacts—which are connected at the inputs of the respective AND gate—are loaded simultaneously. In a simple embodiment, however, AND operations are necessary only in the adjustment of the seat depth, in which case, the fixed contacts A and H (to enlarge the seat depth) or D and E (to shorten the seat depth) are to be switched in each case to inputs of AND gates. The cases a) and d) from Table II, are in which both actuating element parts 5' and 6 are displaced horizontally in opposite directions, just as in the corresponding cases from the first table, can also be implemented by evaluation of the loading of individual fixed contacts, in case a) the fixed contact E, for example, then being in "blank actuation" and in case d) the fixed contact H. Furthermore, it is possible with the sketched arrangement of the switches in case d) to evaluate only the signal from fixed contact H—instead of fixed contact D—for the control of the operation "push backwards" because its only other loading (case K) only triggers an adjustment operation in AND operation with the activation of fixed contact A.

As shown in FIG. 3, instead of the angular shaping of both actuating element parts 5' and 6', a stylistically more pleasing, obliquely increasing contour of a partial joint section 7''' of the partial joint 7 separating two actuating element parts 5'' and 6'' can of course also be provided, at least on the surface perceptible as the seat cushion symbol, attention again needing to be given to the fact that its dimensions, in particular its width projected onto the direction of the mutual approach of the two actuating elements parts 5'' and 6'', enable their mutual approach. In the embodiment shown, the actual partial joint 7 again extends horizontally as in the variation shown in FIG. 1; however, the manual operation corresponds to the variation from FIG. 2. In analogy to the designations in FIG. 2, the front edge—on the left in the figure—of the actuating element 4'' is again formed by (end) section 5.2 of the actuating part 5'', the rear edge on the right in the figure of the actuating element 4'' in turn by (end) section 6.2 of the actuating element part 6''. If required, the contour of the partial joint sections 7'' shown in FIG. 2 can also naturally only be provided in the visible surface while the actual partial joint extends horizontally.

Finally, FIG. 4 shows a view, which is rotated out of its plane by 90° in relation to FIG. 3, of the actuating element 4'' from the direction of the arrow IV entered in FIG. 3, which view depicts the partial external configuration of the two parts 5'' and 6'' and also shows an embodiment possibility for a positive-fit coupling K of the two parts 5'' and 6''.

The mutual cooperation of both actuating element parts—in all embodiment variations—can in particular be implemented by a positive-fit coupling or connection of both parts of the actuating element 4, 4' or 4'', for example by the dovetail guiding shown or another groove/tongue connection, which may allow in one direction the displacement of the two parts in opposite directions, but prevents expansion of the partial joint 7.

In all embodiments shown hitherto and other conceivable embodiments of the divided actuating element, the switching means for the adjustment of the seat depth of the motor vehicle seat are preferably assigned at least to that part of the actuating element which is situated at the front at the top in installation position and which represents in symbolic form the front edge of the seat surface. The operator will thus readily be able to associate a relative movement of the front edge of the seat in relation to the seat frame with the relative movement, of this actuating element part in relation to the other actuating element part assigned to the longitudinal adjustment of the complete seat.

On the electric side of the control device, in all exemplary embodiments at least those fixed contacts which are activated both individually and jointly with one other fixed contact (cases b), c), i), j) in Tables I and II) can be assigned electric retarders, so that a seat adjustment begins with a slight delay after activation of an individual fixed contact; if a further fixed contact for the control of a superimposed adjustment is activated within the time lag, the latter adjustment is executed instead of the adjustment which can be controlled by the individually activated fixed contact.

FIG. 5 shows a variation of the control device according to the invention which represents an integration of the seat depth adjustment in the control device of the generic type. The control device 1 now has a form which, purely externally, is unchanged in relation to the prior art generic type; that is to say it has a single-part switch actuating element 4 as a symbol for seat cushion, which switch actuating element is displaceable in the directions designated in each case with double arrows. However, the switch actuating element 3—the symbol for the seat backrest—is now, in contrast to the embodiment shown in FIG. 1, displaceable in the directions designated by a double arrow extending horizontally in FIG. 5 in the direction of longitudinal extension of the switch actuating element 4, in addition to its pivotability. Consequently an operator can control the change in seat depth via assigned electric switching means. Again the actuating elements 2, 3 and 4 are each guided in a known manner in suitable connecting links and are returned preferably resiliently to their illustrated starting positions. Since the actuating element 3 is arranged in a known manner at an angle to the actuating element 4, by which means in total a two-part seat symbol results, the shortening of the seat depth is associated with its displacement movement to the left from the illustrated position and the lengthening of the seat depth is associated with its displacement movement to the right from the illustrated position since in each case displacement movements of the backrest in relation to the stationary seat cushion are determined.

The electric switching means for this variation need to be supplemented in relation to the known arrangement mentioned at the beginning only by a two-pole change-over contact with a central position assigned to the displacement movement of the actuating element 3, which change-over contact at least indirectly controls an adjustment drive assigned to the seat depth adjustment.

Other operating possibilities ar naturally also conceivable in the latter variation described, such as for example the fact that both actuating elements 3 and 4 have to displaced simultaneously in opposite directions, away from each other for shortening, towards each other for lengthening, the seat depth.

Deviating from the illustrated arrangements of the electric switch contacts, any of the variations shown can, or course, also be fitted with conventional pole-changing switches if no electronic control or evaluation circuit is to be installed. Assigned to each direction of movement of an actuating element there is then a switching axis which can only be swivelled back and forth in the respective direction of movement. For example, in the case of the divided actuating element 4 in FIG. 1, a switching axis of this type is assigned to each of the four double arrows drawn there. Assigned to each of the four switching axes in a two-pole change-over switching contact (rocker switch), the one pole of which conducts positive potential and the other pole of which conducts earth potential. Assigned to each of the two deflection directions of the two-pole rocker switch from its resting position are two fixed contacts which are each directly connected to the stepping motor to be controlled in each case.

Figure 6:
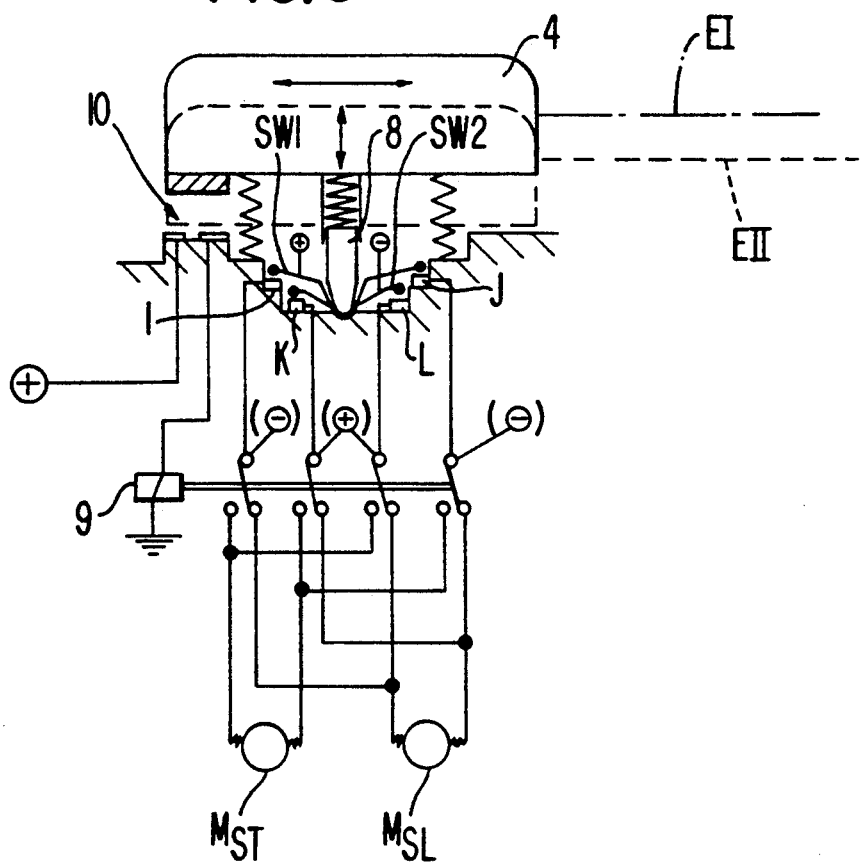
FIG. 6 shows a fifth variation of the control device, in which a second function level for the seat depth adjustment is assigned to the actuating element for the longitudinal adjustment of the seat.

Finally, FIG. 6 shows in very simplified form another advantageous possibility to add seat depth adjustment to the control device of the generic type, according to the invention. In this embodiment, the actuating element 4 for the longitudinal adjustment of the seat has a basic position (drawn in uninterrupted lines), from which it is displaceable in a plane EI in the direction of the horizontal double arrow. In each case one electric motor $M_{SL}$ is provided for the longitudinal adjustment of the seat and one electric motor $M_{ST}$ is provided for the seat depth adjustment. For the reversing control of these two motors, the actuating element 4 is assigned two rocker switches SW1 and SW2, on (SW1) of which is connected (in a manner not shown in detail) to positive potential and the other (SW2) of which is connected to earth potential. Both rocker switches are actuated simultaneously by means of the actuation element 4 via a ram 8 which is resilient in the vertical direction when said actuating element is displaced in the horizontal direction. One fixed contact I corresponds to the left switching contact of the rocker switch SW2 and one fixed contact L to the right switching contact of the same rocker switch. Each of the four fixed contacts I, J, K and L is connected fixedly to one switching contact in each case of a change-over relay 9. The change-over relay 9, in turn, is switched via a pushbuttom 10. The latter is likewise assigned to the actuating element 4 and is actuated when said actuating element is pushed out of its basic position in plane EI—which is set by indicated springs and further suitable guide means (not illustrated-)—vertically downwards into a deviating plane EII, in which it assumes the position drawn in dashed lines.

In reverse in relation to the illustrated embodiment, the pushbutton 10 could naturally also be designed in such a way that it would be switched upwards out of its basic position by the actuating element 4 being pulled out vertically.

It is evident that this pushbutton is designed in such a way that it remains closed when the switching element 11 is set into the deviating plane even at its greatest displacement for the seat adjustment.

The two rocker switches SW1 and SW2 form, in conjunction with the fixed contacts I, J, K and L, a pole change-over switch of the type already specified above. To clarify its electric function, symbols for the electric potentials present there when operating the rocker switches are again drawn in brackets on the four switching contacts of the change-over relay 9. Connected in a generally known manner to the fixed contacts of the change-over relay 9 are the terminals of the two electric motors $M_{SL}$ nd $M_{ST}$, in its illustrated basic position—exciting coil without current—the motor $M_{SL}$ for the longitudinal adjustment of the seat being connected to the pole change-over switch which can be switched by the actuating element 4. For the seat depth adjustment, the operator must thus first adjust the actuating element into the deviating plane EII against resilient resetting forces and then displace it in a customary manner into the desired direction of adjustment of the seat. For the seat depth adjustment slightly greater operating effort is thus required which, however, also increases the attention value of this adjustment. A certain safeguard against unintended adjustment of the seat depth can be guaranteed by providing a catch, which cannot be overcome too easily, in the direction in which the actuating element 4 has to be pushed for operation of the pushbuttom 10.

An embodiment of the latter variation shown is conceivable, but evidently more complicated, in which the actuating element is assigned in each case separate switching means for the longitudinal adjustment of the seat and for the seat depth adjustment, which switching means are set in function depending on the plane EI or EII assumed by the actuating element. A change-over device would no longer be required in an embodiment of this type.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Control device for stepping motors for the adjustment of at least a seat depth dimension of a motor vehicle seat as well as a forward and backward position of said motor vehicle seat, said control having a first switch actuating element which is displaceable at least for forward and backward adjustment of the entire motor vehicle seat and which is arranged within a vehicle passenger compartment and oriented with its direction of displacement corresponding to a desired direction of adjustment of the motor vehicle seat, wherein said actuating element is divided by a partial joint into two parts which are displaceable independently of each other, first switching means for adjustment of seat depth of the motor vehicle seat being coupled to at least one part of the actuating element, and second switching means, for the forward and backward adjustment of the entire motor vehicle seat being coupled at least to the other part of the actuating element; wherein the partial joint is arranged on a straight line through the actuating element, two parts of the actuating element being displaceable along the partial joint both jointly and individually and always remaining aligned parallel to each other.

2. Control device according to claim 1, wherein the switching means for the adjustment of the seat depth of the motor vehicle seat is assigned at least to a top part of the actuating element, and the switching means for the longitudinal adjustment of the entire motor vehicle seat is assigned at least to a bottom part of the actuating element.

3. Control device according to claim 2, wherein the two actuating element parts have parallel displacement paths of different lengths, which different lengths are required for the activation of the respectively assigned switching means.

4. Control device according to claim 1, wherein the switching means for the adjustment of the seat depth of the motor vehicle seat is assigned at least to a part of the actuating element which symbolically represents the front edge of the seat.

5. Control device according to claim 1, wherein the two actuating element parts have parallel displacement paths of different lengths, which different lengths are required for the activation of the respectively assigned switching means.

6. Control device according to claim 1, wherein the switching means for the forward and backward adjustment of the position of the entire motor vehicle seat and for the seat depth adjustment of the motor vehicle seat comprise both parts of the actuating element, the switching means for the forward and backward adjustment being activated by displacement int he same direction of both parts of the actuating element and the switching means for the seat depth adjustment being activated by displacement in opposite directions of the two parts of the actuating element.

7. Control device according to claim 6, wherein the actuating element in the unoperated state has an overall length defined by a front edge and a rear edge, and wherein the front edge of the actuating element is formed by a section of on of the actuating element parts and the rear edge of the actuating element is formed by a section of the other actuating element part, at least one portion of the partial joint extending between the actuating element parts being so arranged and having such a width as to permit displacement in opposite directions of the two actuating element parts with shortening or lengthening of the overall length of the actuating element, and wherein the switching means is activated to reduce the seat depth by displacement in opposite directions in the shortening sense, and to enlarge the seat depth by displacement in opposite directions in the lengthening sense.

8. Control device according to claim 7, wherein two parts of the actuating element are of angular shape, each having two limbs arranged parallel to the corresponding limb of the respective other part, and wherein the partial joint is subdivided into a narrow partial joint section of fixed width, extending between two of the limbs in the direction of the relative displaceability of the two parts, and two wide partial joint sections, extending at an angle to said direction at least on the visible surface of the actuating element, said two wide partial joint sections having variable width on displacement of the two parts in opposite directions.

9. Control device according to claim 8, wherein the displacement of each actuating element part in the direction of the other is limited to a maximum of half the width, measured in said direction, of the wide partial joint section, the switching means assigned to each actuating element part for this direction of displacement being adapted to be activated within this displacement.

10. Control device according to claim 7, having a wide partial joint section of the partial joint, disposed at an angle in relation to the direction of relative displaceability of the two parts, which partial joint section increases obliquely in a straight line, at least on the visible surface of the actuation element, with the variable width on displacing the two parts in opposite directions.

11. Control device according to claim 10, wherein the displacement of each actuating element part in the direction of the other is limited to a maximum of half the width, measured in said direction, of the wide partial joint section, the switching means assigned to each actuating element part for this direction of displacement being adapted to be activated within this displacement.

12. Control device according to claim 7, wherein a positive-fit coupling is provided between the two parts of the actuating element.

13. Control device according to claim 7, which further comprises a second switch actuating element for adjustment of inclination of a backrest of the motor vehicle seat, the first actuating element being arranged at an angle to the second actuating element, and both actuating elements together being configured in a visual representation of a seat with seat cushion and backrest.

14. Control device according to claim 1, which further comprises third switching means coupled to said actuating element for the adjustment of seat height, the said third switching means being responsive to simultaneous vertical displacement of both parts of the actuating element to change the seat height.

15. Control device according to claim 14, which further comprises fourth switching means coupled to said actuating element for the adjustment of seat inclination, said fourth switching means being responsive to the simultaneous swivelling of both parts of the actuating element to change the seat inclination.

16. Control device according to claim 1, in wherein switching contacts are actuated directly by the actuating element and thereby make contact with fixed contacts assigned to them, and wherein one switching contact in each case is assigned to each part of the actuating element, and four fixed contacts in each case are assigned to each switching contact.

17. Control device according to claim 1, wherein a positive-fit coupling is provided between the two parts of the actuating element.

18. Control device according to claim 1, which further comprises a second switch actuating element for adjustment of inclination of a backrest of the motor vehicle sat, the first actuating element being arranged at an angle to the second actuating element, and both actuating elements together being configured in a visual representation of a seat with seat cushion and backrest.

19. Control device according to claim 18, wherein the actuating element is spring biased int he plane of its starting position, and a change-over device is controlled by a pushbutton which can be switched by means of the actuating element during the displacement of the latter into the deviating plane.

20. Control device according to claim 19, wherein change-over of the pushbutton is effected by pulling the actuating element into the deviating plane.

21. Control device according to claim 20, wherein the displacement of the actuating element into the deviating plane, is inhibited by a catch, which can be overcome by increased pressure on the actuating element.

22. Control device according to claim 19, change-over of the pushbutton is effected by depression of the actuating element into the deviating plane.

23. Control device according to claim 22, wherein the displacement of the actuating element into the deviating plane, is inhibited by a catch, which can be overcome by increased pressure on the actuating element.

24. Control device according to claim 1, which further comprises a third actuating element for adjustment of height of a headrest of the motor vehicle seat.

25. Control for stepping motors for adjustment of a motor vehicle seat, comprising:
- a first switching element having a first actuating element at least for forward and backward adjustment of the entire motor vehicle seat in the passenger compartment,
- a second switching element having a second actuating element at least for adjustment of inclination of a backrest with regard to seat surface, which second actuating element can be swivelled about an axis relative to the first actuating element and is oriented with its swivel movement corresponding to a desired swivel direction of the backrest,
- said second actuating element being displaceable in a predetermined manner relative to the first actuating element, and
- switching means responsive to displacement of the second actuating element for adjustment of the distance between a front edge and the backrest of the motor vehicle seat.

26. Control device according to claim 25, wherein the first and the second switch actuating elements are arranged at an angle to each other, and together are configured in a visual representation of a seat with seat cushion and backrest, and
  wherein the displacement movements of the second switch actuating element are guided in the direction of a longitudinal extension of the first switch actuating element.

27. Control for stepping motors for adjustment of at least a seat depth dimension of a motor vehicle seat as well as a forward and backward position of said motor vehicle seat, said control having at least one switching element having an actuating element displaceable in a first plane from a starting position for forward and backward adjustment of the entire motor vehicle seat in a vehicle passenger compartment, said actuating element being oriented with its direction of displacement corresponding to a desired direction of adjustment of the motor vehicle seat, wherein switching means for adjustment of said seat depth is coupled to the same actuating element, said actuating element being displaceable in a second plane deviating from the first plane of its starting position, and being movable only in the deviating second plane for activating the switching means for the adjustment of the seat dept in a direction corresponding to the direction of operation of the forward and backward adjustment of the seat, starting from its starting position.

28. Control device according to claim 27, wherein the switching means of the longitudinal adjustment of the seat correspond to the switching means for the seat depth adjustment and wherein a change-over device, which can be switched by displacement of the actuating element into the deviating plane, causes a change-over of the switching means for the control of the stepping motor to the desired adjustment.

29. Control device according to claim 27, wherein the second plane extends parallel to the first plane of the starting position of the actuating element, the second plane being attainable by displacement of the actuating element perpendicular to the first plane of its basic position.

30. Control device according to claim 27 which further comprises a separate actuating element for the adjustment of the inclination of a backrest of the motor vehicle seat, said actuating element being arranged at an angle to the separate actuating element, and both actuating elements together being configured is a visual representation of a seat with seat cushion and backrest.

* * * * *